US012516683B2

(12) United States Patent
Liu et al.

(10) Patent No.: US 12,516,683 B2
(45) Date of Patent: Jan. 6, 2026

(54) PRESSURE-COMPENSATION HYDRAULIC PUMP, ROTATION SPEED CONTROL SYSTEM AND CONTROL METHOD, AND CONSTRUCTION MACHINERY

(71) Applicants: ZOOMLION HEAVY INDUSTRY SCIENCE AND TECHNOLOGY CO., LTD., Changsha (CN); ZOOMLION SHAANXI WESTERN EARTHMOVING MACHINERY CO., LTD, Weinan (CN); Zoomlion Earthmoving Machinery Co., Ltd., Changsha (CN)

(72) Inventors: Xiangbao Liu, Changsha (CN); Yongfeng Tian, Changsha (CN); Bo Yi, Changsha (CN); Yuanfeng Wu, Changsha (CN); Fujun Deng, Changsha (CN)

(73) Assignees: ZOOMLION HEAVY INDUSTRY SCIENCE AND TECHNOLOGY CO., LTD., Hunan (CN); ZOOMLION SHAANXI WESTERN EARTHMOVING MACHINERY CO., LTD, Shaanxi (CN); ZOOMLION EARTHMOVING MACHINERY CO., LTD., Hunan (CN)

( * ) Notice: Subject to any disclaimer, the term of this patent is extended or adjusted under 35 U.S.C. 154(b) by 452 days.

(21) Appl. No.: 18/029,512

(22) PCT Filed: Sep. 23, 2021

(86) PCT No.: PCT/CN2021/119804

§ 371 (c)(1),
(2) Date: Mar. 30, 2023

(87) PCT Pub. No.: WO2022/068661

PCT Pub. Date: Apr. 7, 2022

(65) Prior Publication Data

US 2024/0011602 A1 Jan. 11, 2024

(30) Foreign Application Priority Data

Sep. 30, 2020 (CN) ........................ 202011065237.X

(51) Int. Cl.
*F15B 11/00* (2006.01)
*F15B 11/05* (2006.01)
*F15B 21/0423* (2019.01)

(52) U.S. Cl.
CPC ......... *F15B 11/055* (2013.01); *F15B 21/0423* (2019.01)

(58) Field of Classification Search
CPC .. F15B 11/055; F15B 11/165; F15B 21/0423; F15B 2211/062; F01P 7/044
See application file for complete search history.

(56) References Cited

U.S. PATENT DOCUMENTS 4,976,106 A * 12/1990 Noerskau .............. E02F 9/2296 60/452
2020/0040553 A1 2/2020 Shirouzu et al.

FOREIGN PATENT DOCUMENTS

CN 103591087 A 2/2014
CN 204003552 U 12/2014
(Continued)

OTHER PUBLICATIONS

Extended European Search Report issued on Feb. 1, 2024 for European Patent Application No. 21874322.7.

*Primary Examiner* — Eric S Ruppert
(74) *Attorney, Agent, or Firm* — Volpe Koenig

(57) ABSTRACT

A pressure-compensation controlled hydraulic pump, comprising an electric proportional pressure compensator, a hydraulic pump, a hydraulic control reversing valve and a servo cylinder; the electric proportional pressure compensator can be electrically connected to a controller, a first hydraulic control port of the hydraulic control reversing (Continued)

valve is connected to an internal oil drain path, and is connected to an internal output oil path by means of a hydraulic control oil inlet path provided with a first throttle valve, a second hydraulic control port is connected to the internal output oil path, and the pressure difference between an opening pressure of the electric proportional pressure compensator and an oil outlet pressure of the hydraulic pump can drive the hydraulic control reversing valve to perform reversing, and selectively enable a piston chamber of the servo cylinder to be in communication with the internal output oil path or the internal oil drain path.

6 Claims, 4 Drawing Sheets

(56) References Cited

FOREIGN PATENT DOCUMENTS

| | | | | | |
|---|---|---|---|---|---|
| CN | 106638758 | A | | 5/2017 | |
| CN | 109695599 | A | | 4/2019 | |
| CN | 112128178 | A | | 12/2020 | |
| CN | 213981485 | U | | 8/2021 | |
| DE | 10019606 | A1 | * | 12/2000 | ............. F01P 7/044 |
| EP | 1967745 | A1 | | 9/2008 | |
| JP | 9-317465 | A | | 12/1997 | |
| JP | 5816601 | B2 | | 10/2015 | |
| JP | 2017115919 | A | | 6/2017 | |
| JP | 2017136887 | A | | 8/2017 | |
| WO | 2013094794 | A1 | | 6/2013 | |

* cited by examiner

PRESSURE-COMPENSATION HYDRAULIC PUMP, ROTATION SPEED CONTROL SYSTEM AND CONTROL METHOD, AND CONSTRUCTION MACHINERY

CROSS REFERENCE TO RELATED APPLICATIONS

This application is a 35 U.S.C. § 371 national stage application of PCT/CN2021/119804, which was filed Sep. 23, 2021 and claims the benefit of the Chinese Patent Application No. 202011065237.X, filed Sep. 30, 2020, both of which are incorporated herein by reference as if fully set forth.

FIELD

The present disclosure relates to construction machineries, in particular to a rotation speed control method for a heat dissipation device of a construction machinery. In addition, the present disclosure further relates to a pressure-compensation controlled hydraulic pump, a rotation speed control system for a heat dissipation device of a construction machinery, and a construction machinery.

BACKGROUND

During the operation of a large-size construction machinery, some of the pressure energy in the hydraulic system is converted into heat energy, consequently the oil temperature in the hydraulic system is increased. To maintain the temperature of the hydraulic oil within a reasonable range, a heat dissipation device has to be utilized to dissipate the heat from the hydraulic oil. Large-size construction machineries, such as excavators and loaders, etc., usually employ a separate heat dissipation control system, which is to say, the input shaft of a cooling fan is not connected to the output shaft of the engine; instead, the cooling fan is driven by a hydraulic motor separately to rotate.

FIG. 1 shows the heat dissipation control system of an excavator in the technology currently available, in which a cooling pump 1 is connected to the output shaft of an engine 2, the hydraulic oil outputted from the cooling pump 1 enters a fan motor 3 to drive the fan motor 3 to rotate, thereby drives a fan 4 to rotate via the fan motor 3. A temperature sensor 5 detects the temperature of the hydraulic oil and feeds the temperature back to a controller 6, which determines a desired rotation speed of the fan 4 through corresponding operations and outputs certain current to an electric proportional overflow valve 7 at the same time, controls the pressure at the oil inlet of the fan motor 3 by adjusting the pressure of the electric proportional overflow valve 7, thereby controls the rotation speed of the fan.

However, in the working process of a construction machinery, the rotation speed of the engine 2 varies with the load, and the speed variation of the engine 2 leads to the variation of the rotation speed of the cooling pump 1, consequently leads to the variation of the output flow rate of the cooling pump 1; the fluctuations of the output flow rate of the cooling pump 1 result in fluctuations of the rotation speed of the fan motor 3, thereby result in fluctuations of the rotation speed of the fan 4. As a result, the rotation speed of the fan 4 cannot be stabilized at a demand value, resulting in an adverse effect on the heat dissipation effect of the hydraulic system on one hand and high noise of the fan 4 on the other hand.

In view of the above problems, it is desirable to design a pressure-compensation controlled hydraulic pump.

SUMMARY

The technical problem to be solved in a first aspect of the present disclosure is to provide a rotation speed control method for a heat dissipation device of a construction machinery, which can stabilize the output flow rate of a hydraulic pump at a demand value, thereby stabilize the rotation speed of the heat dissipation device within a preset rotation speed range.

The technical problem to be solved in a second aspect of the present disclosure is to provide a pressure-compensation controlled hydraulic pump, which can stabilize the output flow rate of a hydraulic pump at a demand value.

The technical problem to be solved in a third aspect of the present disclosure is to provide a rotation speed control system for a heat dissipation device of a construction machinery, which can stabilize the rotation speed of a cooling fan at a demand value.

The technical problem to be solved in a fourth aspect of the present disclosure is to provide a construction machinery, which has a hydraulic system that achieves a good heat dissipation effect and a heat dissipation device that generates lower noise.

To solve the above-mentioned technical problems, in a first aspect, the present disclosure provides a rotation speed control method for a heat dissipation device of a construction machinery, which comprises the following steps: in a first step, acquiring the oil temperature of hydraulic oil in a hydraulic system where the heat dissipation device is located, obtaining a corresponding first pressure value according to the oil temperature of the hydraulic oil, and generating a corresponding second pressure value according to a load pressure generated by the heat dissipation device; in a second step, comparing the first pressure value with the second pressure value; and in a third step, adjusting the displacement of a hydraulic pump for driving the heat dissipation device in the hydraulic system according to a result of the comparison, so that the output flow rate of the hydraulic pump is stabilized within a preset flow rate range when the rotation speed of the hydraulic pump varies, thereby the rotation speed of the heat dissipation device is stabilized within a preset rotation speed range.

Preferably, the first step comprises: obtaining a corresponding current value according to the oil temperature of the hydraulic oil, and obtaining the corresponding first pressure value according to the current value.

Preferably, the second step comprises: inputting the first pressure value and the second pressure value to a pressure comparison module respectively, so as to compare the first pressure value with the second pressure value.

Specifically, the third step comprises: controlling the displacement of the hydraulic pump to increase when the rotation speed of the hydraulic pump is decreased and the first pressure value is greater than the second pressure value, and controlling the displacement of the hydraulic pump to decrease when the rotation speed of the hydraulic pump is increased and the first pressure value is smaller than the second pressure value.

In a second aspect, the present disclosure provides a pressure-compensation controlled hydraulic pump, which comprises a pressure control device, a hydraulic pump and a displacement adjusting device, wherein the displacement adjusting device is adapted to compare a first pressure value generated by the pressure control device with a second pressure value at an oil outlet of the hydraulic pump, and to adjust the displacement of the hydraulic pump according to a result of the comparison, so that the output flow rate of the hydraulic pump is stabilized within a preset flow rate range when the rotation speed of the hydraulic pump varies.

Preferably, the pressure control device is an electric proportional pressure compensator.

Preferably, the displacement adjusting device comprises a hydraulic control reversing valve and a servo cylinder for adjusting the displacement of the hydraulic pump, the oil outlet of the hydraulic pump is connected to an internal output oil path, an oil inlet of the hydraulic pump is connected to an internal input oil path, a first hydraulic control port of the hydraulic control reversing valve is connected to an internal oil drain path via the pressure control device, a piston chamber of the servo cylinder is connected to the internal output oil path and the internal oil drain path respectively via the hydraulic control reversing valve, a pressure difference between the pressure control device and an oil outlet pressure of the hydraulic pump acts on a valve spool of the hydraulic control reversing valve via the first hydraulic control port and a second hydraulic control port of the hydraulic control reversing valve to drive the hydraulic control reversing valve to perform reversing, thereby selectively enables the piston chamber of the servo cylinder to be in communication with the internal output oil path or the internal oil drain path.

Specifically, the first hydraulic control port is connected to the internal output oil path via a hydraulic control oil inlet path provided with a first throttle valve, and a second hydraulic control port of the hydraulic control reversing valve is connected to the internal output oil path.

Specifically, the hydraulic pump is a variable displacement plunger pump.

Specifically, the hydraulic control reversing valve is a two-position three-way reversing valve.

Preferably, a second throttle valve is provided in a connection oil path between the piston chamber of the servo cylinder and the hydraulic control reversing valve.

Specifically, a safety oil path is connected between the piston chamber of the servo cylinder and the internal oil drain path and provided with a third throttle valve, one end of the safety oil path is connected to the connection oil path between the piston chamber of the servo cylinder and the hydraulic control reversing valve, and the connection point is located between the first throttle valve and the second throttle valve, and the other end of the safety oil path is connected to the internal oil drain path at a position after the connection position of an oil outlet of the electric proportional pressure compensator.

In a third aspect, the present disclosure provides a rotation speed control system for a heat dissipation device of a construction machinery, comprising a temperature sensor for detecting the oil temperature of hydraulic oil, a fan motor for driving a fan to rotate, a controller, and the pressure-compensation controlled hydraulic pump according to any of the technical schemes in the second aspect, wherein the temperature sensor is electrically connected to the controller, and the controller can receive a signal from the temperature sensor and control the first pressure value generated by the pressure control device according to the signal, and the pressure generated by the fan motor when driving the fan is fed back to the oil outlet of the hydraulic pump to form the second pressure value.

In a fourth aspect, the present disclosure provides a construction machinery, comprising a heat radiator for cooling hydraulic oil and the rotation speed control system for a heat dissipation device of a construction machinery according to the technical scheme in the third aspect, wherein the fan motor can drive the fan to rotate to cool the heat radiator.

With the pressure-compensation controlled hydraulic pump provided in the basic embodiments of the present disclosure, when the rotation speed of a power drive unit that provides mechanical energy to the hydraulic pump varies, the displacement adjusting device can adjust the displacement of the hydraulic pump, so that the output flow rate of the hydraulic pump is stabilized at a demand value, thereby the rotation speed of a actuator element driven by the hydraulic pump is stabilized at a demand value, and the operation of the actuator element is more stable.

Other advantages of the present disclosure and the technical effects of preferred embodiments will be further detailed below in the embodiments.

DETAILED DESCRIPTION

Some embodiments of the present disclosure will be detailed below with reference to the accompanying drawings. It should be understood that the embodiments described herein are only provided to describe and explain the present disclosure, but are not intended to constitute any limitation to the present disclosure.

In the present disclosure, it should be noted that the terms “connect” and “arrange” shall be interpreted in their general meanings, for example, a connection may be a fixed connection, a detachable connection, or an integral connection; may be a direct connection or an indirect connection via an intermediate medium, or internal communication between two elements or interaction between two elements, unless otherwise specified and defined explicitly. Those having ordinary skills in the art may interpret the specific meanings of the terms in the present disclosure in their context.

The terms “first”, “second” and “third” are only for a descriptive purpose, but shall not be understood as indicating or implying relative importance or implicitly indicating the quantity of the indicated technical features. Therefore, features defined by “first”, “second” or “third” may expressly or impliedly include one or more features.

Figure 1:
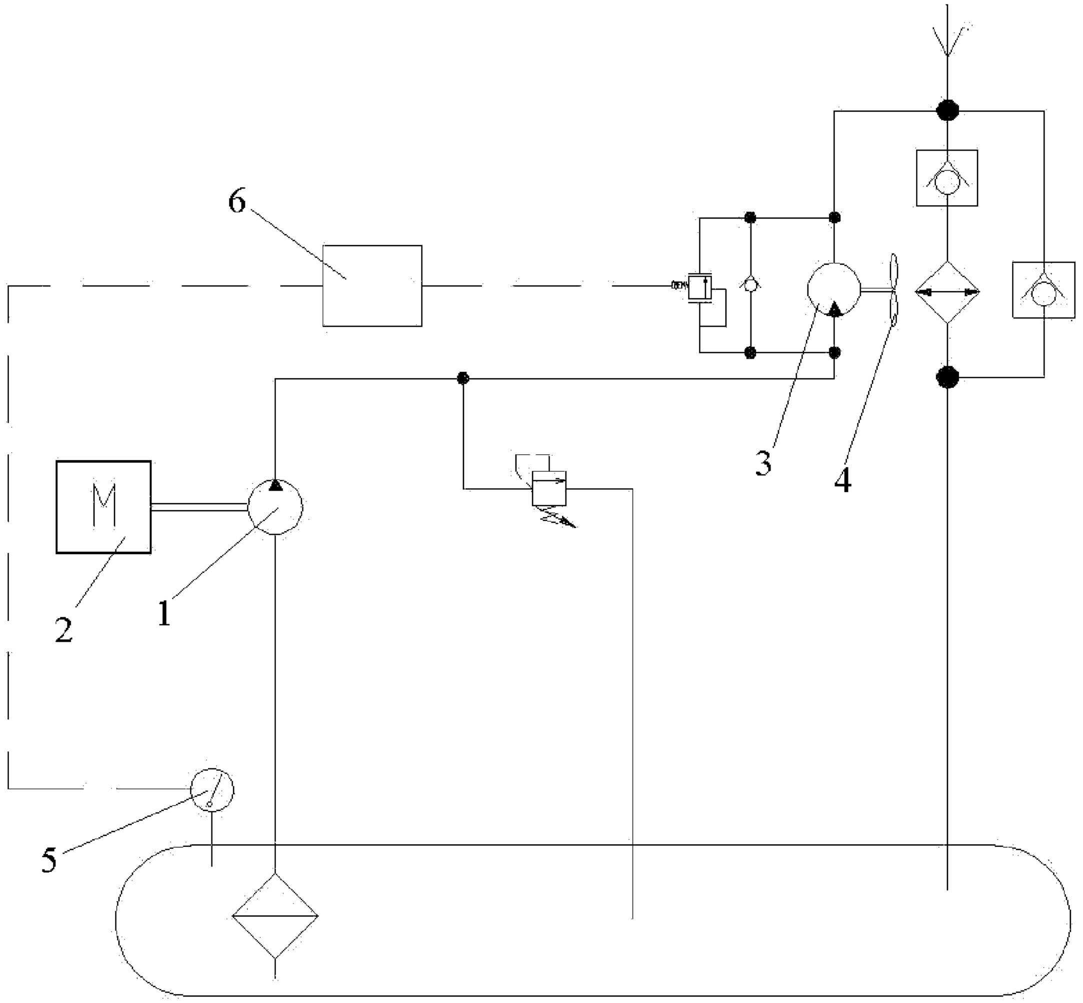
FIG. 1 is a hydraulic schematic diagram of a heat dissipation control system of a construction machinery in the technology currently available.
Figure 2:
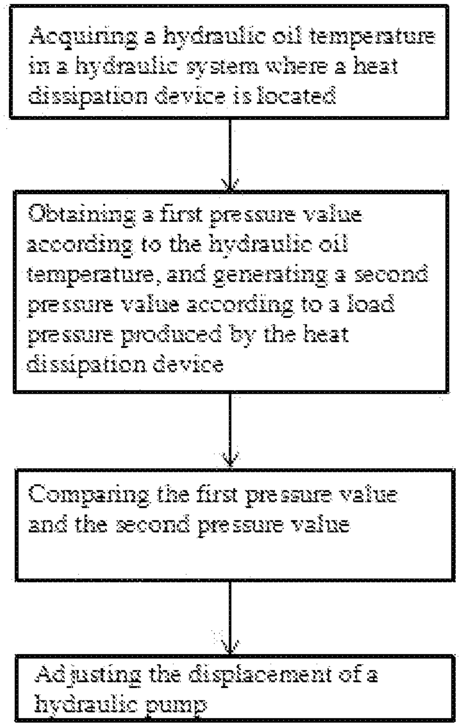
FIG. 2 is a flow chart of the rotation speed control method for a heat dissipation device of a construction machinery in the present disclosure.

FIG. 2 shows a basic flow chart of the rotation speed control method for a heat dissipation device of a construction machinery provided in the present disclosure. Specifically, the oil temperature of hydraulic oil in a hydraulic system where the heat dissipation device is located is acquired first, a corresponding first pressure value is obtained according to the oil temperature of the hydraulic oil, and a corresponding second pressure value is generated according to a load pressure generated by the heat dissipation device; the first pressure value is compared with the second pressure value; and the displacement of a hydraulic pump for driving the heat dissipation device in the hydraulic system is adjusted according to a result of the comparison, so that the output flow rate of the hydraulic pump is stabilized within a preset flow rate range when the rotation speed of the hydraulic pump varies, thereby the rotation speed of the heat dissipation device is stabilized within a preset rotation speed range. Owing to the fact that the displacement of a hydraulic pump multiplied by the rotation speed of the hydraulic pump is equal to the flow rate of the hydraulic pump multiplied by time, the control method can adjust the displacement of the hydraulic pump in real time when the rotation speed of the hydraulic pump varies, so that the output flow rate of the hydraulic pump is essentially stabilized at a demand value, thereby the rotation speed of a heat dissipation device driven by the hydraulic pump is stabilized at a demand value, and the operation of the heat dissipation device is more stable.

Preferably, the displacement control mechanism of the hydraulic system comprises an electric proportional pressure compensator, a corresponding current value is obtained according to the oil temperature of the hydraulic oil, and a current value is inputted into the electric proportional pressure compensator to control an opening pressure of the electric proportional pressure compensator, wherein the opening pressure is a first pressure value.

Specifically, a pressure comparison module of the hydraulic system comprises a servo cylinder 13 for controlling the displacement and a hydraulic control reversing valve 12 for controlling the servo cylinder 13 to extend and retract, and the first pressure value and the second pressure value act on hydraulic control ports at the two ends of the hydraulic control reversing valve 12 respectively; the valve spool of the hydraulic control reversing valve 12 can move to the smaller one of the first pressure value and the second pressure value, thereby the first pressure value is compared with the second pressure value. The displacement of the hydraulic pump is controlled to increase when the rotation speed of the hydraulic pump is decreased and the first pressure value is greater than the second pressure value, and the displacement of the hydraulic pump is controlled to decrease when the rotation speed of the hydraulic pump is increased and the first pressure value is smaller than the second pressure value.

Figure 3:
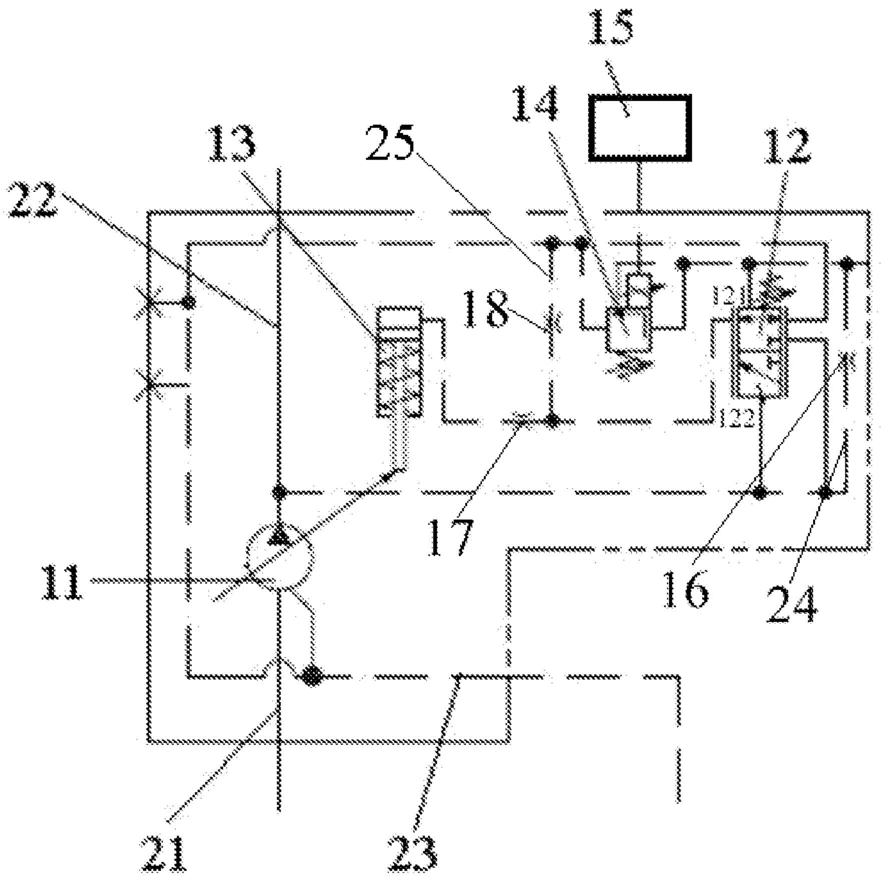
FIG. 3 is a hydraulic schematic diagram of the pressure-compensation controlled hydraulic pump in the present disclosure.
Figure 6:
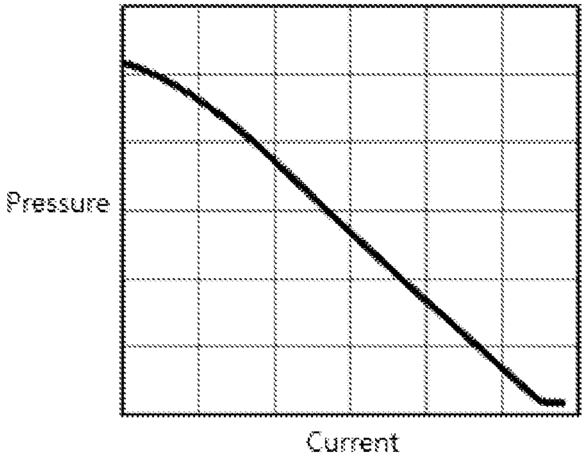
FIG. 6 is a control curve graph of the electric proportional pressure compensator in the present disclosure.

In an embodiment of the present disclosure, as shown in FIG. 3, the pressure-compensation controlled hydraulic pump comprises an electric proportional pressure compensator 14, a hydraulic pump 11, a hydraulic control reversing valve 12, and a servo cylinder 13 for adjusting the displacement of the hydraulic pump 11. The electric proportional pressure compensator 14 is electrically connected to a controller 15, so as to adjust an opening pressure of the electric proportional pressure compensator 14 via the controller 15. As shown in FIG. 6, usually the electric proportional pressure compensator 14 employs an inversely proportional control mode, i.e., the opening pressure can be decreased by increasing the current. The oil outlet of the hydraulic pump is connected to an internal output oil path 22, the oil inlet of the hydraulic pump is connected to an internal input oil path 21, a power drive device 34 is connected to the hydraulic pump 11 to supply power to the hydraulic pump 11; thus, variations of the rotation speed of the power drive device 34 lead to variations of the rotation speed of the hydraulic pump 11 and further affect the output flow rate of the hydraulic pump 11; the hydraulic pump 11 can drive an connected actuator element via a hydraulic circuit, and fluctuations of the output flow rate of the hydraulic pump 11 lead to fluctuations of the rotation speed of the actuator element. A first hydraulic control port 121 of the hydraulic control reversing valve 12 is connected to an internal oil drain path 23 via the electric proportional pressure compensator 14, and the first hydraulic control port 121 is connected to an internal output oil path 22 via an hydraulic control oil inlet path 24 provided with a first throttle valve 16, wherein the first throttle valve 16 attains pressure and flow rate regulation effects, so that the pressure at the first hydraulic control port 121 of the hydraulic control reversing valve 12 is smaller than the pressure at a second hydraulic control port 122, the second hydraulic control port 122 of the hydraulic control reversing valve 12 is connected to the internal output oil path 22, and the hydraulic control reversing valve 12 is preferably a two-position three-way directional control valve. A piston chamber of the servo cylinder 13 is connected to the internal output oil path 22 and the internal oil drain path 23 respectively via the hydraulic control reversing valve 12, a pressure difference between an opening pressure of the electric proportional pressure compensator 14 and the pressure at the oil outlet of the hydraulic pump acts on a valve spool of the hydraulic control reversing valve 12 via the first hydraulic control port 121 and the second hydraulic control port 122 to drive the hydraulic control reversing valve 12 to perform reversing, thereby selectively enables the piston chamber of the servo cylinder 13 to be in communication with the internal output oil path 22 or the internal oil drain path 23; the oil input into the piston chamber of the servo cylinder 13 or oil output from the piston chamber of the servo cylinder 13 makes a push rod of the servo cylinder 13 extend or retract, thereby adjusts the displacement of the hydraulic pump 11 by adjusting the inclination angle of a swash plate of the hydraulic pump 11.

The working principle of the pressure-compensation controlled hydraulic pump in the above embodiment of the present disclosure is described below.

Figure 5:
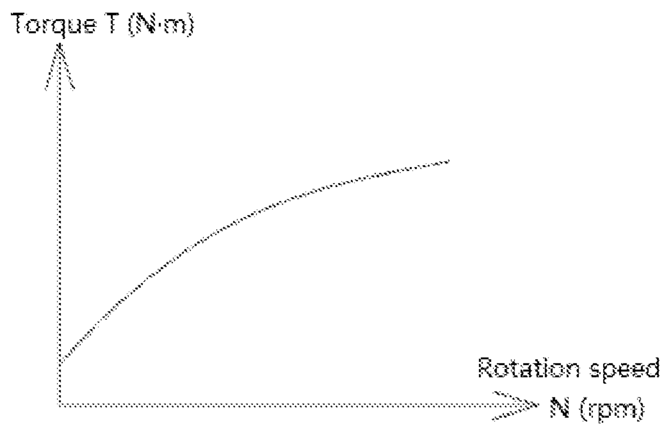
FIG. 5 is a relational graph of the rotation speed vs. the torque of a fan.

When the rotation speed of the power drive device 34 is increased and causes an increased rotation speed of the hydraulic pump 11, as shown in FIG. 5, the rotation speed of the actuator element is increased thereby the torque of the actuator element is increased, the load pressure generated by the actuator element is fed back to the oil outlet of the hydraulic pump, so that the pressure at the second hydraulic control port 122 is greater than the pressure at the first hydraulic control port 121, and the electric proportional pressure compensator 14 reaches an opening pressure, the hydraulic oil in the internal output oil path 22 enters the valve via the second hydraulic control port 122 of the hydraulic control reversing valve 12, and the hydraulic oil flows out of the first hydraulic control port 121, passes through the electric proportional pressure compensator 14 to the internal oil drain path 23, the valve spool moves and makes the piston chamber of the servo cylinder 13 in communication with the internal output oil path 22, the oil flows into the piston chamber, and the displacement of the hydraulic pump is decreased; as the displacement of the hydraulic pump 11 is decreased gradually, the output flow rate of the hydraulic pump 11 is decreased, thereby the load pressure of the actuator element fed back to the oil outlet of the hydraulic pump is decreased; at that point, the pressure at the second hydraulic control port 122 is lower than the pressure at the first hydraulic control port 121, the electric proportional pressure compensator 14 is closed because the pressure is lower than the opening pressure, the hydraulic oil in the hydraulic control oil inlet path 24 enters the valve via the first hydraulic control port 121, and is drained via the second hydraulic control port 122, the valve spool moves and makes the piston chamber of the servo cylinder 13 in communication with the internal oil drain path 23, the oil is drained from the piston chamber, and the displacement of the hydraulic pump 11 is increased; thus, the opening pressure of the electric proportional pressure compensator 14 and the pressure at the oil outlet of the hydraulic pump are always kept in a dynamic balance state, thereby the output flow rate of the hydraulic pump 11 is maintained essentially at the demand value. To increase or decrease the output flow rate of the hydraulic pump 11, the opening pressure of the electric proportional pressure compensator 14 may be increased or decreased.

Thus, when the rotation speed of the power drive device 34 varies, the servo cylinder 13 can adjust the displacement of the hydraulic pump 11, so that the output flow rate of the hydraulic pump 11 is essentially stabilized at the demand value, thereby the rotation speed of the actuator element driven by the hydraulic pump is stabilized at the demand value, and the operation of the actuator element is more stable; moreover, by controlling the opening pressure of the electric proportional pressure compensator 14 via the controller 15, the demand value of the output flow rate of the hydraulic pump 11 can be adjusted conveniently; the valve spool of the hydraulic control reversing valve 12 moves in small amplitudes continuously under the action of the opening pressure of the electric proportional pressure compensator 14 and the pressure at the oil outlet of the hydraulic pump to adjust the relative position in the valve body, so that oil flows into or out of the piston chamber of the servo cylinder 13, thereby the output flow rate of the hydraulic pump 11 is adjusted accurately and sensitively.

Specifically, the hydraulic pump 11 is a variable displacement plunger pump, the displacement of which can be adjusted more conveniently. The push rod of the servo cylinder 13 can adjust the displacement of the hydraulic pump 11 by adjusting the inclination angle of a swash plate of the variable displacement plunger pump.

Preferably, a second throttle valve 17 is provided in the connection oil path between the piston chamber of the servo cylinder 13 and the hydraulic control reversing valve 12. The second throttle valve 17 can adjust the oil inflow rate and oil outflow rate of the piston chamber of the servo cylinder 13; when the flow rate through the second throttle valve 17 is high, the response rate of the pressure-compensation controlled hydraulic pump is high, but the disturbances to the hydraulic oil and the impact on the pipeline in the system are high.

Preferably, a safety oil path 25 is connected between the piston chamber of the servo cylinder 13 and the internal oil drain path 23 and is provided with a third throttle valve 18, one end of the safety oil path 25 is connected to the connection oil path between the piston chamber of the servo cylinder 13 and the hydraulic control reversing valve 12, and the connection point is between the first throttle valve 16 and the second throttle valve 17; the other end of the safety oil path 25 is connected to the internal oil drain path 23 at a position after the connection position of the oil outlet of the electric proportional pressure compensator 14. The valve spool of the hydraulic control reversing valve 12 moves in small amplitudes continuously in the valve; when the valve spool is at a specific position, the hydraulic control reversing valve 12 is closed, making the piston chamber of the servo cylinder 13 a dead space, i.e., the oil path between the piston chamber and the hydraulic control reversing valve 12 becomes a rigid oil path. It should be noted that the first throttle valve, the second throttle valve and the third throttle valve may be replaced with damping holes.

Figure 4:
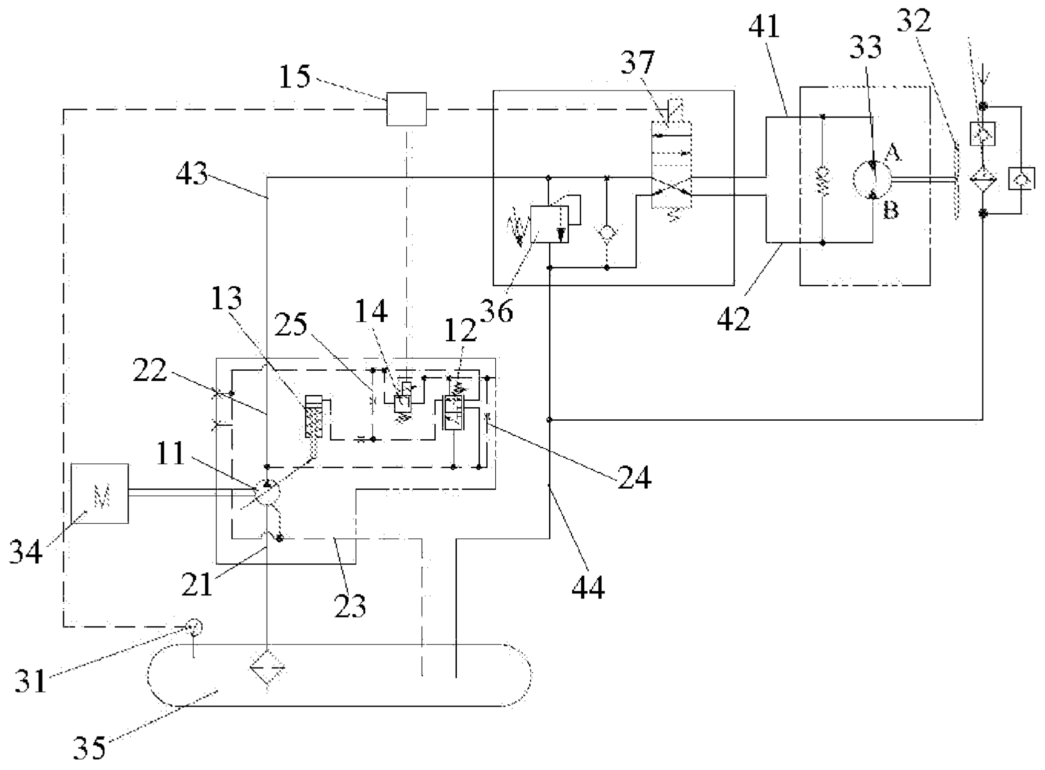
FIG. 4 is a hydraulic schematic diagram of the rotation speed control system for a heat dissipation device of a construction machinery in the present disclosure.

As shown in FIG. 4, based on the technical scheme of the above-mentioned pressure-compensation controlled hydraulic pump in the present disclosure, the present disclosure provides a rotation speed control system for a heat dissipation device of a construction machinery, which comprises a temperature sensor 31 for detecting the oil temperature of hydraulic oil, a fan motor 33 for driving a fan 32 to rotate, and a pressure-compensation controlled hydraulic pump, the hydraulic pump 11 of which is connected to a power drive device 34, the power drive device 34 may be a common drive device, such as an engine or electric motor, etc., an internal input oil path 21 and an internal oil drain path 23 are connected to an oil tank 35, a first working oil port A and a second working oil port B of the fan motor 33 are connected to a first working oil path 41 and a second working oil path 42 respectively, the first working oil path 41 and the second working oil path 42 are connected to a main oil inflow path 43 and a main oil return path 44 via a main reversing valve 37 to switch the fan motor 33 to rotate in a normal direction or a reversed direction, a controller 15 is electrically connected to the temperature sensor 31 to receive a signal from the temperature sensor 31 and controls an opening pressure of the electric proportional pressure compensator 14 according to the signal, thereby controls the displacement of the hydraulic pump 11 to adjust the rotation speed of the fan 32.

The working principle of the rotation speed control system for a heat dissipation device of a construction machinery in the basic embodiments of the present disclosure is described below.

Figure 7:
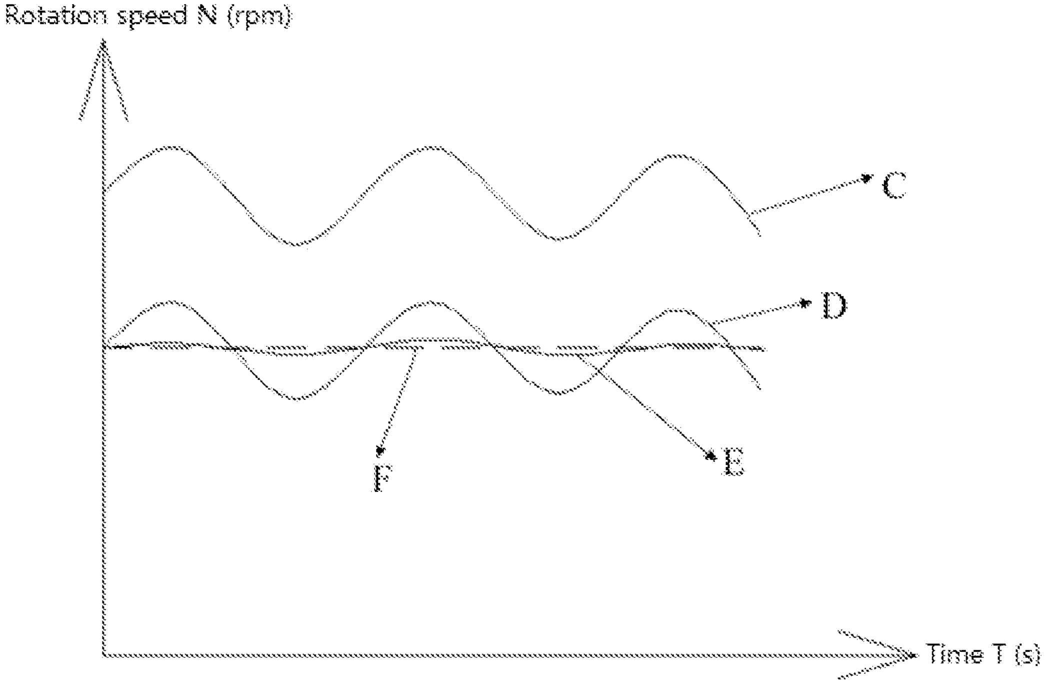
FIG. 7 is a schematic curve graph of the variation of the rotation speed of the fan in the rotation speed control system with the load in the present disclosure.
Figure 8:
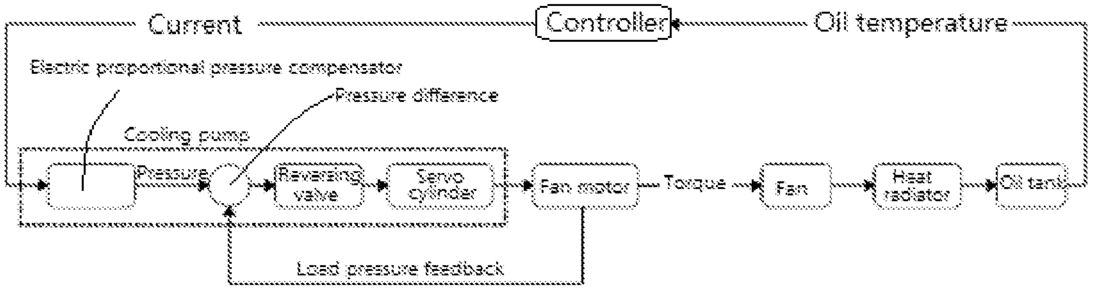
FIG. 8 is a control flow chart of the rotation speed control system for a heat dissipation device of a construction machinery in the present disclosure.

As shown in FIGS. 3 and 7, the pressure-compensation controlled hydraulic pump in the present disclosure is applied in a rotation speed control system for a heat dissipation device, the hydraulic pump drives the hydraulic oil to enter the main oil inflow path 43 and the second working oil path 42 sequentially, then flow back to the oil tank 35 through the first working oil path 41 and the main oil return path 44, thereby an oil loop is formed to drive the fan motor 33 to rotate; when the fan motor 33 rotates in the normal direction, it can drive the fan 32 to rotate in the normal direction, thereby dissipate heat from the heat radiator; after the main reversing valve 37 performs reversing, the hydraulic pump 11 drives the hydraulic oil to enter the main oil inflow path 43 and the first working oil path 41 sequentially, then flows back to the oil tank 35 through the second working oil path 42 and the main oil return path 44, thereby an oil loop is formed to drive the fan motor 33 to rotate in the reversed direction; when the fan motor 33 rotates in the reversed direction, it can drive the fan 32 to rotate in the reversed direction, thereby the dust on the heat radiator is blown off. When the rotation speed of the engine is increased so that the rotation speed of the hydraulic pump 11 is increased, the load pressure generated by the fan motor 33 is increased and fed back to the oil outlet of the hydraulic pump 11, the opening pressure of the electric proportional pressure compensator 14 is lower than the pressure at the oil outlet of the hydraulic pump, and the displacement of the pressure-compensation controlled hydraulic pump is decreased adaptively; as the displacement of the hydraulic pump 11 is decreased gradually, the output flow rate of the hydraulic pump 11 is decreased, thereby the load pressure of the fan motor 33 fed back to the oil outlet of the hydraulic pump is decreased, the opening pressure of the electric proportional pressure compensator 14 is greater than the pressure at the oil outlet of the hydraulic pump, and the displacement of the pressure-compensation controlled hydraulic pump is increased adaptively. The temperature sensor sends the detected oil temperature to the controller 15, which outputs corresponding current through operations to control the opening pressure of the electric proportional pressure compensator 14, so as to increase or decrease the output flow rate of the hydraulic pump.

Thus, as shown in FIG. 7, where C represents the rotation speed of the engine, D represents the rotation speed of a fan in the technology currently available, E represents the rotation speed of the fan in the present disclosure, F represents a target rotation speed of the fan. When the rotation speed of the engine varies, the displacement of the pressure-compensation controlled hydraulic pump can vary correspondingly, so that the output flow rate of the hydraulic pump 11 is essentially maintained at a demand value, thereby the rotation speed of the fan motor 33 is essentially maintained at a demand value; rotation speed E of the fan in the present disclosure is closers to the target rotation speed F of the fan, thereby a better heat dissipation effect can be attained, and the noise generated owing to the fluctuations of the rotation speed of the fan 32 can be avoided or effectively reduced.

Preferably, the oil tank 35 is a closed-type oil tank, to prevent impurities from mixed into the hydraulic oil and keep the hydraulic oil clean.

Preferably, a probe of the temperature sensor 31 is arranged at the bottom of the oil tank 35 to acquire the real-time oil temperature of the hydraulic oil. Of course, the probe of the temperature sensor 31 may be arranged at other positions as required according to the design.

An overflow valve 36 is provided between the main oil inflow path 43 and the main oil return path 44, to control the pressure in the main oil inflow path 43 and control excessive oil to flow back to the oil tank 35.

Preferably, the main reversing valve 37 is a solenoid directional control valve that is electrically connected to the controller 15, and the controller 15 can control the main reversing valve 37 to perform reversing, so that the fan motor 33 is switched to rotate in the normal direction or reversed direction.

A check valve is connected in parallel between the two ends of the fan motor 33, and can replenish oil to the second working oil port B of the fan motor 33 when the fan motor 33 rotates in the reversed direction. The fan motor 33 rotates in the normal direction in the normal state; when the fan motor 33 is switched to rotate in the reversed direction, the disturbances to the hydraulic oil in the system are higher, so as to prevent an excessive pressure at the second working oil port B of the fan motor 33.

A construction machinery disclosed in the present disclosure comprises a heat radiator for cooling the hydraulic oil and the rotation speed control system for a heat dissipation device of a construction machinery according to any of the above technical schemes, wherein a fan motor 33 can drive the fan 32 to rotate to cool the heat radiator. Since the construction machinery disclosed in the present disclosure employs all technical schemes in the above embodiments, it at least has all beneficial effects brought by the technical schemes in the above embodiments.

While the present disclosure is described above in detail in some preferred embodiments with reference to the accompanying drawings, the present disclosure is not limited to those embodiments. Various simple variations may be made to the technical scheme in the present disclosure, including combinations of the specific technical features in any appropriate form, within the scope of the technical ideal of the present disclosure. To avoid unnecessary repetition, various possible combinations are not described specifically in the present disclosure. However, such simple variations and combinations shall also be deemed as having been disclosed and falling in the scope of protection of the present disclosure.

The invention claimed is:

1. A pressure-compensation controlled hydraulic pump, comprising a pressure control device, a hydraulic pump and a displacement adjusting device, wherein the displacement adjusting device is adapted to compare a first pressure value generated by the pressure control device with a second pressure value at an oil outlet of the hydraulic pump, and to adjust the displacement of the hydraulic pump according to a result of the comparison, so that the output flow rate of the hydraulic pump is stabilized within a preset flow rate range when the rotation speed of the hydraulic pump varies, wherein the displacement adjusting device comprises a hydraulic control reversing valve and a servo cylinder for adjusting the displacement of the hydraulic pump, the oil outlet of the hydraulic pump is connected to an internal output oil path, an oil inlet of the hydraulic pump is connected to an internal input oil path, a first hydraulic control port of the hydraulic control reversing valve is connected to an internal oil drain path via the pressure control device, a piston chamber of the servo cylinder is connected to the internal output oil path and the internal oil drain path respectively via the hydraulic control reversing valve, a pressure difference between the pressure control device and an oil outlet pressure of the hydraulic pump acts on a valve spool of the hydraulic control reversing valve via the first hydraulic control port and a second hydraulic control port of the hydraulic control reversing valve to drive the hydraulic control reversing valve to perform reversing, thereby selectively enables the piston chamber of the servo cylinder to be in communication with the internal output oil path or the internal oil drain path, and wherein the first hydraulic control port is connected to the internal output oil path through a hydraulic control oil inlet path provided with a first throttle valve, and the second hydraulic control port of the hydraulic control reversing valve is connected to the internal output oil path.

2. The pressure-compensation controlled hydraulic pump of claim 1, wherein the pressure control device is an electric proportional pressure compensator.

3. The pressure-compensation controlled hydraulic pump of claim 1, wherein the hydraulic control reversing valve is a two-position three-way reversing valve.

4. The pressure-compensation controlled hydraulic pump of claim 1, wherein a second throttle valve is provided in a connection oil path between the piston chamber of the servo cylinder and the hydraulic control reversing valve.

5. The pressure-compensation controlled hydraulic pump of claim 4, wherein a safety oil path is connected between the piston chamber of the servo cylinder and the internal oil drain path and provided with a third throttle valve, one end of the safety oil path is connected to the connection oil path between the piston chamber of the servo cylinder and the hydraulic control reversing valve, and the connection point is located between the first throttle valve and the second throttle valve; and the other end of the safety oil path is connected to the internal oil drain path at a position after the connection position of an oil outlet of the pressure control device.

6. A construction machinery, comprising a heat radiator for cooling hydraulic oil and a rotation speed control system, wherein the rotation speed control system comprises a temperature sensor for detecting the oil temperature of the hydraulic oil, a fan motor for driving a fan to rotate, a controller and a pressure-compensation controlled hydraulic pump, the pressure-compensation controlled hydraulic pump comprises a pressure control device, a hydraulic pump and a displacement adjusting device, wherein the displacement adjusting device is adapted to compare a first pressure value generated by the pressure control device with a second pressure value at an oil outlet of the hydraulic pump, and to adjust the displacement of the hydraulic pump according to a result of the comparison, so that the output flow rate of the hydraulic pump is stabilized within a preset flow rate range when the rotation speed of the hydraulic pump varies, and wherein the temperature sensor is electrically connected to the controller, and the controller is arranged to receive a signal from the temperature sensor and control the first pressure value generated by the pressure control device according to the signal, and the pressure generated by the fan motor when driving the fan is fed back to the oil outlet of the hydraulic pump to form the second pressure value, and wherein the fan motor is arranged to drive the fan to rotate to cool the heat radiator, wherein the displacement adjusting device comprises a hydraulic control reversing valve and a servo cylinder for adjusting the displacement of the hydraulic pump, the oil outlet of the hydraulic pump is connected to an internal output oil path, an oil inlet of the hydraulic pump is connected to an internal input oil path, a first hydraulic control port of the hydraulic control reversing valve is connected to an internal oil drain path via the pressure control device, a piston chamber of the servo cylinder is connected to the internal output oil path and the internal oil drain path respectively via the hydraulic control reversing valve, a pressure difference between the pressure control device and an oil outlet pressure of the hydraulic pump acts on a valve spool of the hydraulic control reversing valve via the first hydraulic control port and a second hydraulic control port of the hydraulic control reversing valve to drive the hydraulic control reversing valve to perform reversing, thereby selectively enables the piston chamber of the servo cylinder to be in communication with the internal output oil path or the internal oil drain path, and wherein the first hydraulic control port is connected to the internal output oil path through a hydraulic control oil inlet path provided with a first throttle valve, and the second hydraulic control port of the hydraulic control reversing valve is connected to the internal output oil path.

* * * * *